United States Patent [19]

Babel

[11] Patent Number: 4,705,440
[45] Date of Patent: Nov. 10, 1987

[54] TOOL HOLDER FOR MILLING OR BORING MACHINE

[75] Inventor: Werner Babel, Pfronten-Meilingen, Fed. Rep. of Germany

[73] Assignee: MAHO Aktiengesellschaft, Pfronten, Fed. Rep. of Germany

[21] Appl. No.: 810,511

[22] Filed: Dec. 18, 1985

[30] Foreign Application Priority Data

Dec. 28, 1984 [DE] Fed. Rep. of Germany ....... 3447595

[51] Int. Cl.$^4$ .............................................. B23C 5/26
[52] U.S. Cl. ................................... 409/233; 408/239 R
[58] Field of Search ............... 409/233, 232, 231, 234; 408/239 R, 239 A, 240

[56] References Cited
U.S. PATENT DOCUMENTS 4,242,019  12/1980  Roch ............................... 409/233 X Primary Examiner—Z. R. Bilinsky
Attorney, Agent, or Firm—Lahive & Cockfield

[57] ABSTRACT

The subject matter of the invention is a tool-clamping device, more particularly for milling and drilling machines, consisting of a clamping arrangement (5) with clamping tongues (6), arranged centrally and longitudinally displaceably in the tool spindle (2), of a rotational position indicator for presetting the clamping jaws into their tool-change position, and of a positioning mechanism (11, 15) for finely adjusting and fixing the tool spindle (2) in the tool-change position. In order to achieve automatic positioning of the tool spindle (2) in its tool-change position after presetting by means of the rotational position indicator, the positioning device has a cross pin (11) which is secured to the clamping arrangement (5), projects through an elongated axial hole (13) in the tool spindle (2), and is guided between two guide surfaces of a guide member (15) on longitudinal movement of the clamping arrangement (5).

5 Claims, 2 Drawing Figures

TOOL HOLDER FOR MILLING OR BORING MACHINE

TECHNICAL FIELD OF THE INVENTION

The invention relates to a tool-clamping device, more particularly for milling and drilling machines, consisting of a clamping arrangement with clamping tongues, arranged centrally and longitudinally in the tool spindle of a rotational position indicator for presetting the tool spindle into its tool-changing position, and of an indexing device for finely adjusting and fixing the tool spindle in the tool-changing position.

In order to be able to change the tools automatically in numerically controlled milling and drilling machines, the tool spindle in the spindle head or in the vertical milling head must be positioned and fixed exactly in a certain angular position so that the changer can grasp the tool taper of the worn tool securely and can subsequently insert the new tool with its steep-angle taper into the clamping jaws with accuracy. To this purpose, a rotational indicator detects the rotational movement of the spindle and switches off the driving motor via the control as soon as the spindle has substantially reached its changing position. This may be done by a contact switch 33 actuated by a recess 34 on the spindle shaft, as shown in FIG. 1. The spindle is thus positioned within a range of angular tolerance of at best a few degrees, which is not sufficient for reliable, automatic tool changing. For this reason, additional indexing devices are used which bring the spindle exactly into its changing position and fix it there after the spindle has stopped and after disengagement of a coupling in the gear unit of the driving train. To this purpose special arrangements having their own drives have hitherto been used, requiring a certain amount of technical expense.

SUMMARY AND OBJECT OF THE INVENTION

The object of the invention is to provide a toolclamping device, more particularly for milling and drilling machines, which makes it possible to index the tool spindle in the tool-change position automatically in a technically simple manner.

According to the invention this object is achieved by the indexing device having a cross pin which is secured to the clamping arrangement, projects through an elongated axial hole in the spindle sleeve and is guided between guide surfaces on longitudinal movement of the clamping jaws.

The idea underlying the invention is to utilize the longitudinal movement of the clamping arrangement in the work spindle, that is necessary for any tool change, in order to adjust the tool spindle exactly into its toolchanging position and to fix it in this position in order to carry out the tool change. This is effected by guiding the free end of the cylindrical cross pin between the guide surfaces, which extend parallel to the spindle axis, resulting in a corresponding rotation of the clamping arrangement about its longitudinal axis as the cylindrical cross pin runs in between the guide surfaces. As the cross pin is also guided in the elongated hole of the tool spindle without any play, this rotation of the clamping arrangement is transferred to the tool spindle which is thereby adjusted and moved into the exact toolchanging position.

The two guide surfaces are advantageously formed on a member which is arranged adjustably in the spindle head and is normally located in the path of the cross pin. The guide member can however be moved out of the path of the cross pin in the case of abnormal operating conditions, so that the tool spindle can be stopped in any rotational position and the tool can then be changed by hand. The guide member is advantageously in the form of two plates which are parallel to one another and which are secured to a shaft which may be rotated by hand. A hand crank for manual rotation is advantageously provided at one end of the shaft, said hand crank having as its handle a spring-loaded locking bolt associated with an electric switch which is coupled with the numerical control. Withdrawal of the handle breaks the interlock of the crank and the shaft and at the same time moves the switch into the inoperative position whereupon the shaft, and with it the guide member, can be rotated into its inoperative position.

BRIEF DESCRIPTION OF THE DRAWINGS

An embodiment of the invention is now described in detail by way of example with reference to the drawing, in which.

DETAILED DESCRIPTION OF THE INVENTION

Figure 1:
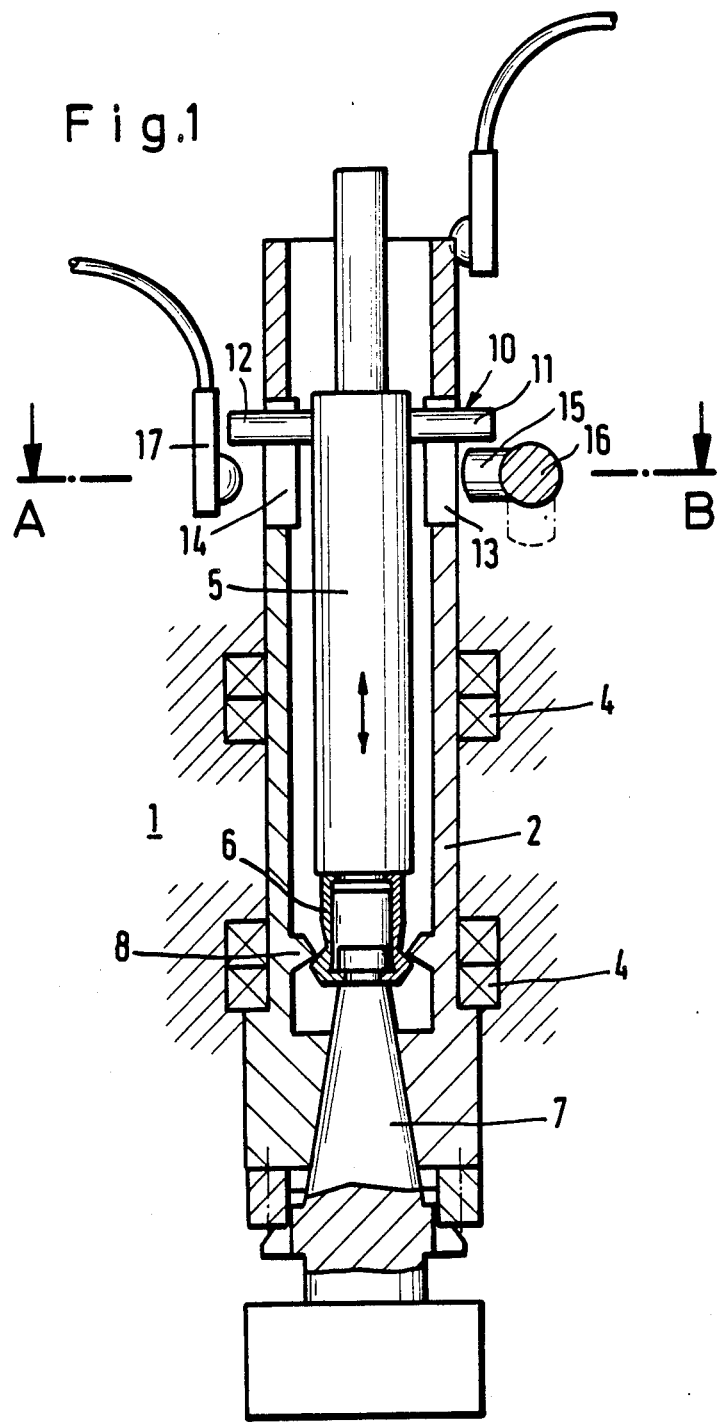
FIG. 1 shows an axial section through a tool spindle with the tool-clamping device according to the invention.

As shown, a tool spindle 2 is mounted to rotate in bearings 4 in a spindle head 1. In the tool spindle 2 a clamping arrangement 5 is provided centrally and so that it may be displaced longitudinally by means of a drive (not shown) said arrangement having clamping tongues 6 at its lower end in FIG. 1 for grasping the steep-angle taper 7 of a tool. In the gripping position shown in FIG. 1 the clamping tongues 6 bear against the inclined surface of a conical shoulder 8 inside the tool spindle. A downward axial displacement of the clamping arrangement 5 in FIG. 1 causes the clamping tongues 6 to spread open and thereby release the steep-angle taper 7 of the tool.

Secured to the upper end of the clamping arrangement 5 there is a cylindrical cross pin 10, each of whose two protruding ends 11, 12, projects without any play, through a hole 13, 14 in the tool spindle, elongated parallel to its axis, and protrudes beyond the periphery of the spindle. In the position shown in FIG. 1, a guide member 15 is arranged under the right-hand end 11 of the cross pin 10, and secured, so that it protrudes radially, to a shaft 16 which extends in the spindle housing transversely to the longitudinal axis of the spindle. By rotation of the shaft through 90°, the guide member 15 can be moved out of the operating position represented by continuous lines into the inoperative position represented by broken lines.

The left-hand end portion 12 of the cross pin 10 projecting through the elongated hole 14 forms a tripping pin for actuating a limit switch 17. This limit switch is positioned in respect of the tripping pin 12 so that it is actuated as soon as the clamping jaws 5 have moved along a pre-determined displacement path and the steepangle taper 7 of the tool has thereby been released from the clamping tongues 6. Through this actuation of the limit switch 17, the tool changer with its gripping organs is set in operation via the numerical control in order to withdraw the steep-angle taper 7 of the tool from the spindle 2.

Figure 2:
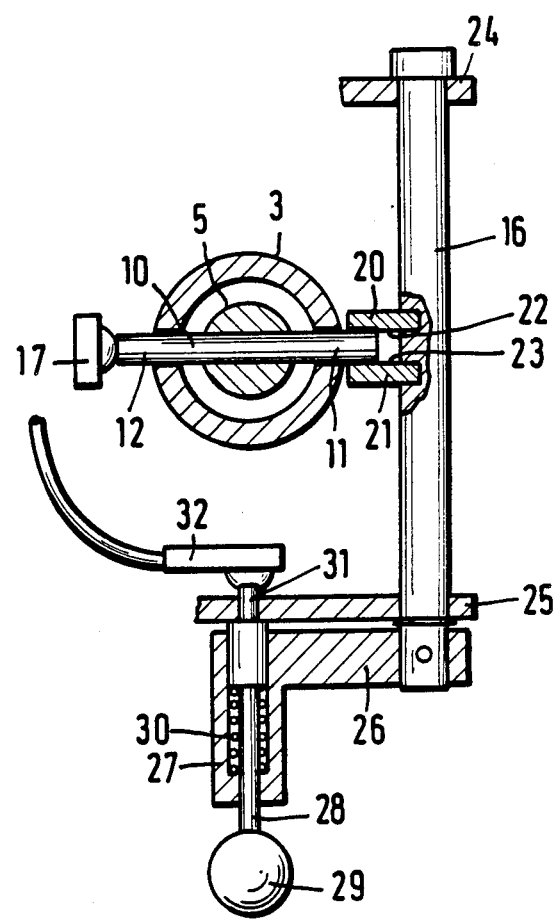
FIG. 2 shows a section A-B in FIG. 1.

As shown in FIG. 2, the guide member 15 consists of two parallel plates 20, 21 with facing guide surfaces 22, 23 for the cylindrical cross pin 10. The shaft 16 is mounted at both ends in partition walls 24, 25 of the spindle head 1 and carries at its lower end a crank 26 in whose angled leg 27 the bolt 28 of a handle 29 is mounted so that it may be displaced longitudinally against the force of a spring 30. The bolt 28 ends in a tripping pin 31 which projects through a bore in the wall 25 and forms the switching member for an electric switch 32. By drawing back the bolt 28 by means of the handle 29 against the force of the spring 30, the switch 32 is actuated by means of the tripping pin 31, and after the tripping pin 31 has been withdrawn from the bore in the wall 35 the crank 26 is released and can be turned by hand, whereby the guide member is swung out of the operating position, represented by solid lines in FIG. 1, into its inoperative position, drawn in in broken lines. The indexing device is thereby put out of action and the steep-angle taper of the tool can be changed, for example, by hand, in any rotational position.

The invention is not restricted to the exemplary embodiment represented. For example, instead of the through cross pin 10 separate members can be provided for indexing and for actuating the limit switch 17. Furthermore, other actuating arrangements for the clamping tongues 6 are also possible.

What is claimed is:

1. A tool-clamping device for milling and drilling machines, comprising a tool spindle and a clamping arrangement with clamping tongues, arranged centrally and longitudinally displaceably in the tool spindle, a rotational position indicator for resetting the tool spindle into a tool-changing position, and a positioning mechanism for the tool spindle, wherein the tool spindle has an axially elongated hole, and wherein the positioning mechanism includes
   a. a cross member secured to the clamping arrangement which projects without play through the axially elongated hole, and
   b. guide means including two guide surfaces for guiding the cross member therebetween on longitudinal movement of the clamping arrangement.

2. A clamping device according to claim 1, wherein the guide surfaces are formed on a guide member arranged in the spindle head so that it may be moved into the path of the cross pin.

3. A clamping device according to claim 2, wherein the guide means includes two guide plates secured to a shaft such that rotation of the shaft moves the guide plates into the path of the cross member.

4. A clamping device according to claim 1, further including a tripping member secured to the clamping arrangement which projects through an elongated hole in the spindle sleeve for actuating a limit switch coupled to a numerical control, on movement of the clamping arrangement into the tool-changing position.

5. A clamping device according to claim 2, further including lock means for securing the guide member in relation to the cross member, and switch means responsive to motion of the lock means for providing a control signal indicative of lock means position.

* * * * *